(12) United States Patent  (10) Patent No.: US 8,498,523 B2
Deivasigamani et al.  (45) Date of Patent: Jul. 30, 2013

(54) APPARATUS AND CONTROL METHOD FOR A HYBRID TANKLESS WATER HEATER

(75) Inventors: Sridhar Deivasigamani, Peoria, IL (US); Sivaprasad Akasam, Peoria, IL (US)

(73) Assignee: Intellihot, Inc., Galesburg, IL (US)

( * ) Notice: Subject to any disclaimer, the term of this patent is extended or adjusted under 35 U.S.C. 154(b) by 730 days.

(21) Appl. No.: 12/692,628

(22) Filed: Jan. 24, 2010

(65) Prior Publication Data

US 2010/0195991 A1   Aug. 5, 2010

Related U.S. Application Data

(60) Provisional application No. 61/149,418, filed on Feb. 3, 2009.

(51) Int. Cl.
*F24C 1/00* (2006.01)

(52) U.S. Cl.
USPC ............ 392/308; 392/307; 392/441; 392/449; 392/465

(58) Field of Classification Search
None
See application file for complete search history.

(56) References Cited

U.S. PATENT DOCUMENTS

| | | | | |
|---|---|---|---|---|
| 2,642,046 | A * | 6/1953 | Alexander | 122/15.1 |
| 3,249,303 | A * | 5/1966 | Townsend | 237/8 R |
| 4,970,373 | A | 11/1990 | Lutz et al. | |
| 5,504,306 | A | 4/1996 | Russell et al. | |
| 5,660,165 | A * | 8/1997 | Lannes | 126/641 |
| 6,370,328 | B1 * | 4/2002 | Mottershead | 392/452 |
| 6,640,047 | B2 * | 10/2003 | Murahashi et al. | 392/308 |
| 6,907,846 | B2 | 6/2005 | Hur et al. | |
| 7,460,769 | B2 * | 12/2008 | Ryks | 392/490 |
| 2003/0005892 | A1 | 1/2003 | Baese et al. | |
| 2005/0177281 | A1 | 8/2005 | Caves et al. | |
| 2008/0197205 | A1 | 8/2008 | Ene et al. | |
| 2008/0265046 | A1 | 10/2008 | Grimes | |

FOREIGN PATENT DOCUMENTS

| | | |
|---|---|---|
| EP | 0267649 A1 | 5/1988 |
| JP | 58-096920 A | 6/1983 |
| JP | 61-101742 A | 5/1986 |
| JP | 01-300153 A | 12/1989 |
| JP | 05-256515 A | 10/1993 |
| JP | 08-247550 A | 9/1996 |
| JP | 2006-250497 A | 9/2006 |
| JP | 2007-244689 A | 9/2007 |
| KR | 10-1999-0027494 A | 4/1999 |
| KR | 10-1999-0053126 A | 7/1999 |
| KR | 10-0245421 B1 | 3/2000 |

OTHER PUBLICATIONS

Navien High Efficiency Tankless Water Heater, webpage, http://www.goodingd.com/html/GPS/Navien.ppt, p. 23, Estimated Jan. 2008, U.S.
Comparison of Noritz 841MC Series and Navien CR-240A, webpage, http://www.noritz.com/u/noritz_841mc_vs_navien_cr240a.pdf, p. 1, Sep. 2008, U.S.

* cited by examiner

*Primary Examiner* — Thor Campbell
(74) *Attorney, Agent, or Firm* — Tracy Jong Law Firm; Tracy P. Jong; Cheng Ning Jong

(57) ABSTRACT

An on demand tankless water heater system that is capable of quickly delivering water within a desired temperature range. The tankless water heater provides a hybrid heating method that contains a primary heating system and a secondary heating system disposed in a buffer tank that cooperate to facilitate control of output water temperature during water usage. A pressure differential switch detects low flow demand and allows the secondary heating system to provide immediate heating to the water. This secondary heating system provides a faster temperature response and fine tuning of output water temperature.

20 Claims, 5 Drawing Sheets

APPARATUS AND CONTROL METHOD FOR A HYBRID TANKLESS WATER HEATER

PRIORITY CLAIM AND RELATED APPLICATIONS

This application claims the benefit of priority from provisional application U.S. Ser. No. 61/149,418 filed on Feb. 3, 2009 in the names of Sridhar Deivasigamani and Sivaprasad Akasam of Peoria, Ill. Said application is incorporated by reference in its entirety.

FIELD OF INVENTION

This invention relates to apparatus and control methods for water heaters, and more specifically, to hybrid tankless water heaters.

BACKGROUND ART

Most water heaters are capable of delivering water at a desired temperature in steady state conditions where the water demand or flow rate is substantially constant. However, water heating systems presently available or prior art water heating systems fall short when attempting to maintain a water output at a constant predetermined temperature level during rapid shifts or fluctuations in water demand. It is understood that the demand for water is directly related to the output flow rate requested from the water heating system. Prior art water heating systems will provide the water output flow rate corresponding to the water demand placing the predetermined temperature setting as a secondary consideration. Placing predetermined water output temperature as a secondary consideration creates two major thermal related problems. The first issue is encountered during a rapid increase in water demand, wherein the user or device experiences a sudden drop in water temperature or a cold water splash. The remaining issue occurs during a rapid decrease in water demand, wherein the user or device experiences a sudden spike in water temperature, thereby creating a possible burn or scald type hazard. Furthermore, none of the prior art water heaters are capable of delivering water at the predetermined or desired temperature range without substantial delays. The rapid shifts in water demand creates a transient condition within the water heating system wherein such existing systems are ill equipped to handle.

On-demand water heaters are gaining popularity because of their reduced space requirement in addition to improved energy advantages. The current on-demand water heaters have well known drawbacks, most notably, the uncontrollable and undesirable fluctuation of temperature of the output water during water usage. When output water flow increases, the temperature of the output water decreases. Conversely, when output water flow decreases, the temperature of the output water increases. This creates undesirable temperature fluctuations for users, appliances, and the like. Disadvantages of these tankless water heaters are well known in the art and general population, such a discussion is described in Wikipedia, and reads as follows:

Installing a tankless system comes at an increased cost, particularly in retro-fit applications. They tend to be particularly expensive in areas such as the US where they are not dominant, compared to the established tank design. If a storage water heater is being replaced with a tankless one, the size of the electrical wiring or gas pipeline may have to be increased to handle the load and the existing vent pipe may have to be replaced, possibly adding expense to the retrofit installation. Many tankless units have fully modulating gas valves that can range from as low as 10,000 to over 1,000,000 BTUs. For electrical installations (non-gas), AWG 10 or 8 wire, corresponding to 10 or 6 $mm^2$, is required for most POU (point of use) heaters at North American voltages. Larger whole house electric units may require up to AWG 2 wire. In gas appliances, both pressure and volume requirements must be met for optimum operation.

There is a longer wait to obtain hot water. A tankless water heater only heats water upon demand, so all idle water in the piping starts at room temperature. Thus there is a more apparent "flow delay" for hot water to reach a distant faucet.

There is a short delay between the time when the water begins flowing and when the heater's flow detector activates the heating elements or gas burner. In the case of continuous use applications (showers, baths, washing machine) this is not an issue. However, for intermittent use applications (for example when a hot water faucet is turned on and off repeatedly) this can result in periods of hot water, then some small amount of cold water as the heater activates, followed quickly by hot water again. The period between hot/cold/hot is the amount of water which has flowed though the heater before becoming active. This cold section of water takes some amount of time to reach the faucet and is dependent on the length of piping.

Since a tankless water heater is inactive when hot water is not being used, they are incompatible with passive (convection-based) hot water recirculation systems. They may be incompatible with active hot water recirculation systems and will certainly use more energy to constantly heat water within the piping, defeating one of a tankless water heater's primary advantages.

Tankless water heaters often have minimum flow requirements before the heater is activated, and this can result in a gap between the cold water temperature, and the coolest warm water temperature that can be achieved with a hot and cold water mix.

Similarly, unlike with a tank heater, the hot water temperature from a tankless heater is inversely proportional to the rate of the water flow—the faster the flow, the less time the water spends in the heating element being heated. Mixing hot and cold water to the "right" temperature from a single-lever faucet (say, when taking a shower) takes some practice. Also, when adjusting the mixture in mid-shower, the change in temperature will initially react as a tanked heater does, but this also will change the flow rate of hot water. Therefore some finite time later the temperature will change again very slightly and require readjustment. This is typically not noticeable in non-shower applications. A temperature compensating valve tends to eliminate this issue. Tankless systems are reliant on the water pressure that is delivered to the property. In other words, if a tankless system is used to deliver water to a shower or water faucet, the pressure is the same as the pressure delivered to the property and cannot be increased, whereas in tanked systems the tanks can be positioned above the water outlets (in the loft/attic space for example) so the force of gravity can assist in delivering the water, and pumps can be added into the system to increase pressure. Power showers, for example, cannot be used with tankless systems because it cannot deliver the hot water at a fast enough flow-rate required by the pump.

A typical water demand scenario is provided in the following example. A first user draws water at a desired temperature at a bathroom faucet while simultaneously a second user opens a kitchen faucet. The output water temperature experienced by both users dramatically decreases since the total flow rate through the water heater increases, and thus, the volume of water to be heated per unit of time has increased while the burner output remains constant (or the system is not capable of keeping pace with the increased water demand). At the other end of the spectrum, in a situation where two users are using water at desired temperature at two separate faucets, where one user closes a faucet, the remaining open faucet will experience a spike (dramatic increase) in temperature. This is due to a decrease in the volume of water to be heated per unit time resulting in a reduction of water flow through the water heater resulting in an increase in output water temperature.

Other well known drawbacks associated current on demand water heaters include the cold sandwich effect, freeze hazards, and dead zones. Controls for water heaters are plagued with limitations and lack the sophistication to maximize system efficiency.

The purpose of the present invention is to overcome several shortcomings in the aforementioned prior art as well as the introduction of additional novel features.

SUMMARY OF THE INVENTION

The present invention overcomes the shortcomings of the prior art by providing several new and novel structures and methods for an improved hybrid tankless water heater. Briefly described, in a preferred embodiment, the improved hybrid tankless water heater overcomes the aforementioned prior art disadvantages, and better aligns with the needs and desires of a typical user by the addition of several subsystems assemblies, one such subsystem includes a thermally insulated mixing buffer tank disposed downstream from the heat exchanger located within the primary heating subsystem. The mixing buffer tank has turbulence inducing baffles to facilitate mixing. There is further provided a secondary heating element to supply supplemental heat, preferably disposed in the mixing buffer tank. Further provided is a differential pressure switch that functions to rapidly detect trickle or low flow conditions and activate or pre-activate primary and/or secondary heating elements depending on the detected real time water demand. Pre-activation shall be understood as a sensitive detection scheme that predicts usage given relatively small input signals. Also included is a recirculating system, and an inverted burner system in the primary heating subsystem comprising an array of coiled tubing surrounding an axially disposed radial burner, and a buffer tank which forms the core plug at exit end of the coil tubing forcing heated air drawn in from the entry end of the coil tubing to surround the exit end of the coil tubing effectively transferring heat to the water flowing inside the coil tubing.

One aspect of the novel controls method of the present invention includes receiving inputs, such as pressure differential to detect low flow levels and has outputs that eliminate hunting, allow fine adjustment of temperature, and prevent overshoot. Another aspect of the novel control method of the present invention maintains water at a predetermined target temperature, e.g. above 33 degrees Fahrenheit, by re-circulating, initiating a secondary electric heating element, pulse firing the burner of a primary heating element, or any combination thereof. There is provided a controller comprising a processor, memory and software for managing the outlet temperature to a desired temperature corresponding to given portions within a given day, week, or the like.

It is an object of the present invention to minimize variation of the water heater's predetermined outlet temperature regardless of rapid shifts or fluctuations in water demand.

It is another object of the present invention to minimize delays associated with achieving predetermined target temperatures at the water heater output.

It is yet another object of the present invention to minimize or eliminate the cold sandwich effects in transient system situations.

It is yet another object of the present invention to minimize or eliminate dead zones (conditions where water flow is below detection using typical sensing means) in a transient system.

It is yet another object of the present invention to minimize or eliminate the problem of bacteria growth in stored water supplies and water system components.

It is yet another object of the present invention to provide a method of controlling temperature and water flow in a water heater to maximize efficiency and response time.

It is yet another object of the present invention to provide fine heating modulation.

It is yet another object of the present invention to minimize or avoid both firing and transient delays.

It is yet another object of the present invention to minimize or eliminate freeze hazards.

It is yet another object of the present invention to actively monitor and detect system leaks.

It is yet another object of this invention to provide a hybrid tankless water heater that is relatively economical from the viewpoint of the manufacturer and consumer, is susceptible to low manufacturing costs with regard to labor and materials, and which accordingly is then susceptible of low prices for the consuming public, thereby making it economically available to the buying public.

Whereas there may be many embodiments of the present invention, each embodiment may meet one or more of the foregoing recited objects in any combination. It is not intended that each embodiment will necessarily meet each objective.

In this respect, before explaining at least one embodiment of the invention in detail, it is to be understood that the invention is not limited in its application to the details of construction and the arrangements of the components set forth in the following description or illustrated in the drawings. The present invention is capable of other embodiments and of being practiced and carried out in various ways. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

PARTICULAR ADVANTAGES OF THE INVENTION

The present invention provides an apparatus and method for minimizing variation of the water heater's predetermined outlet temperature regardless of rapid shifts or fluctuations in water demand by disposing a buffer tank downstream from the primary heat exchanger. Delayed temperature response as well as temperature fluctuations at the water heater's output is minimized by providing supplemental heat (provided from an energy source other that natural gas) via a secondary heating element. This secondary heating element also provides fine heating modulation. Temperature response delays are also minimized by providing a means to rapidly detect conditions that require additional sources of heat to the water heater. The problem of dead zones (conditions where water flow is below detection using typical prior art sensing means) is solved by utilizing a means to detect trickle, low-level, or low flow followed by activating a secondary heating element associated with a recirculation path, circuit, or watercourse from which the output of the water heater can tap into. In the present invention, detecting trickle flow or low flow rapidly is accomplished by using a differential pressure switch. By controlling outlet temperature to a desired temperature at set time periods in a day, the present invention advantageously avoids both firing and transient delays. The present invention also minimizes the cold sandwich effect in a transient system by mixing the fluid in the buffer tank via recirculation. The present invention optionally includes an antibacterial hot water flush mode that inhibits bacteria growth and/or sanitizes stored water supplies and water system components. This is accomplished by recirculation of outlet flow and maintaining water temperature at an elevated temperature for a predetermine period of time capable of killing off the target microbes, for example, 140 degrees Fahrenheit for 20 minutes. Water freezing hazards are minimized by actively maintaining water at above freezing temperatures by re-circulating and activating a secondary electric heat source and/or pulse firing the burner of the primary heat source (e.g. vacation mode). Transient temperature spikes are reduced by means of controlling a blower that operates independent of the burner and a recirculation pump. There is provided baffles or a barrel-hole style inlet system for creating turbulence and promoting mixing of the incoming water with existing water in the buffer tank.

By mounting the flow sensor outside of the recirculation circuit, there is no pressure loss imparted by the flow sensor. This allows the use of a pump with a lower power rating, thereby making the water heater more economical. Additionally, no proprietary pump or flow sensor are required. Flue condensate backup or blockage is detected by using a condensate level sensor system. The present invention optionally includes a feature that enables a user to set or program an automatic temperature rise rate and a high temperature limit. A baffle mixes pre-combusted air in the vicinity of the heat exchanger, thereby promoting heat transfer from the exterior surfaces of the heat exchanger to the pre-combusted air and recovering this absorbed heat of the pre-combusted air by redistributing it to colder portions of the heat exchanger surfaces.

User maintenance is facilitated by decoding fault code(s) and optionally providing audible or text speech corrective procedures. Active and continuous monitoring performance and health of the water heater, and automatic adjustment of operating parameters, minimizes unforeseen service shutdowns.

BRIEF DESCRIPTION OF THE DRAWINGS

The invention will be described by reference to the specification and the drawings, in which like numerals refer to like elements, and wherein.

Figure 1:
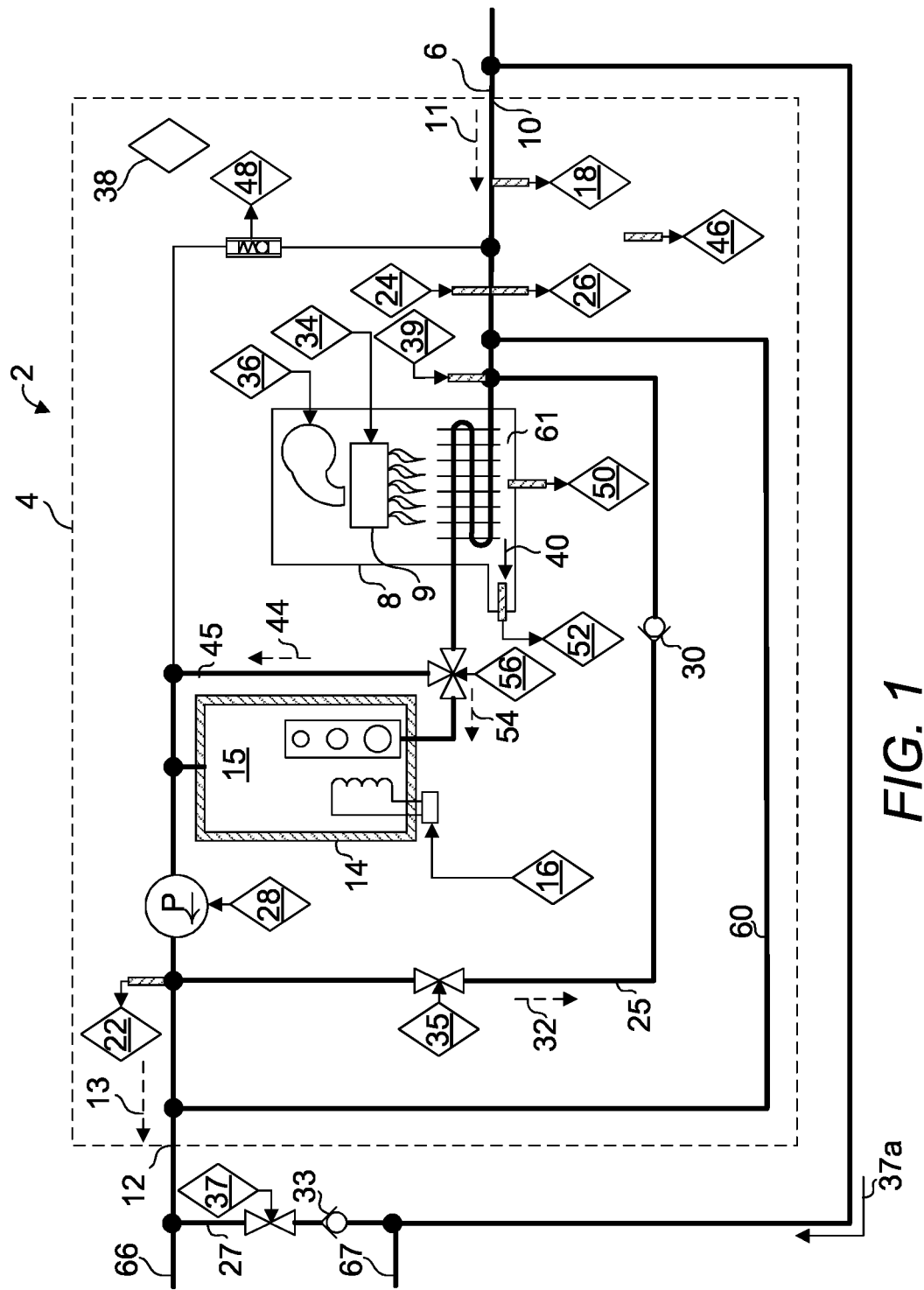
FIG. 1 is one embodiment of a hot water heater system of the present invention.

The drawings are not to scale, in fact, some aspects have been emphasized for a better illustration and understanding of the written description. For simplicity in representing the complex controls scheme, the diamonds in the block figures schematically represent input and/or output devices. Arrows pointing toward a diamond represent input devices, arrows pointing away from a diamond represent output devices and arrows both pointing toward and away from a diamond represent a dual input-output device.

PARTS LIST

2—hot water heater
4—hot water heater enclosure
6—flow path
8—primary heating system (burner including heat exchanger)
9—primary heating process
10—inlet of water heater
11—inlet flow
12—outlet flow
13—mixed flow for second point of demand
14—thermal insulation for mixing buffer tank
15—mixing buffer tank
16—secondary heating element (electric heater)
17—secondary heating process
18—inlet temperature sensor
19—external auxiliary device circuit
21—mixed flow (for second point of demand)
22—outlet temperature sensor
23—outlet temperature sensor for auxiliary demand
24—flow limiting valve
25—internal recirculating flow circuit
26—flow sensor
27—external recirculating flow circuit
28—recirculation pump
29—blower speed feedback
30—internal recirculation check valve
31—portion of recirculation flow
32—internal recirculating flow
33—external recirculation check valve
34—burner
35—internal recirculation modulating valve
36—blower
36a—blower fan speed control
37—external recirculation modulating valve
37a—external recirculation flow
38—controller
39—temperature sensor (merged flow)
40—flue gas exit
41—merged flow temperature signal
42—expansion tank
43—user interface
44—bypass flow (buffer tank)
45—buffer tank bypass line
46—moisture sensor
47—external auxiliary device modulating valve
48—differential pressure switch
50—condensate level sensor
52—flue gas temperature sensor
53—external gas usage input signal
54—buffer tank flow
56—buffer tank bypass three way valve
59—auxiliary three way valve
60—capillary bypass line 61—distal end of the heat exchanger
64—auxiliary heat sink
66—first demand point
67—cold water point of demand
68—second demand point
70—outlet temperature ($T_{outlet}$)
72—inlet temperature ($T_{inlet}$)
74—desired temperature ($T_{desired}$)
76—temperature difference ($T_{desired}-T_{outlet}$)
78—temperature difference ($T_{desired}-T_{inlet}$)
80—flow rate
82—flue gas temperature
84—flue gas temperature limit—flue gas temperature
90—feedforward control
92—feedback control
94—main control
96—safety control
98—secondary heat control (electric heat)
100—recirculation control
102—flow limiting valve control
104—differential pressure switch
106—differential pressure signal
108—flue temperature limit
112—available power Also it is to be understood that the phraseology and terminology employed herein are for the purpose of description and should not be regarded as limiting.

DEFINITIONS OF TERMS USED IN THIS SPECIFICATION

The term hybrid tankless water heating system shall have equivalent nomenclature including: the hybrid water heater, the heater, the device, the present invention, or the invention. As used in this specification, the following terms shall be defined as follows:

Hybrid water heater shall mean a water heater that combines two heating means, via a primary heating element and a secondary heating element, such as a gas burner and an electric immersion coil.

Usage is defined as units of "damage."

"Damage" is a quantity of usage as seen in a water heater. "Damage" can include the effects of scaling, wear, burner cycles, amount of water delivered, etc. An increased usage of a water heater causes a corresponding increase in the amount of "damage."

The efficiency of a water heating system is defined as the amount of converted thermal energy in the delivered water per unit of energy input. The efficiency of a water heater system is typically nonlinear with respect to flow rate.

Additionally, the term "exemplary" shall possess only one meaning in this disclosure; wherein the term "exemplary" shall mean: serving as an example, instance, or illustration.

DETAILED DESCRIPTION OF A PREFERRED EMBODIMENT

FIG. 1 illustrates one embodiment of a novel hybrid tankless water heater 2 ("water heater") and the relative placement of various components of the system. Briefly described, the water heater 2 comprises an enclosure 4 having a thermally insulated mixing buffer tank 15 with baffles disposed downstream from a heat exchanger of a primary heating system 8. There is further provided a secondary heating element 16 to supply supplemental heat, preferably disposed in mixing buffer tank 15. The combination of two heating systems (such as gas and immersion electric) thus renders the present invention a "hybrid" water heater.

Optionally there is further provided a differential pressure switch 48 that functions to rapidly detect a need to turn on primary 8 or secondary 16 heating elements by detecting trickle or low flow. There is also provided an internal recirculating system 25 and an inverted burner system in primary heating system 8. The differential pressure switch is an important feature of the present invention in that it provides a means for fine controlling of output water temperature, a means for expedient temperature response to a demand, and a means for detecting leakage and activating associated alarms or alerts.

Other embodiments may include advantageous features described in greater detail below, including a moisture sensor in the enclosure, an integrated buffer and expansion tank or an independent expansion tank, a condensate level sensor, a capillary bypass line, a blower that operates independent of the burner and recirculation pump, and a feature that allows the user to set an automatic temperature rise rate and a high temperature limit. Yet other additional advantageous features are provided and described herein, including features to enhance user ability for self-maintenance of the water heater.

A demand at first demand point 66 causes a fluid flow to enter the water heater 2 at inlet 10 and exit water heater 2 at outlet 12. In the illustrative embodiment, water at first demand point 66 is not mixed with cold incoming water upon receiving heat from system heat sources (e.g., primary heating element 9 and secondary heating element 16), however, it is contemplated that water at first demand point 66 may be mixed with a cold water supply via a three way valve connection or other similar mechanism.

Continuing to refer to FIG. 1, water heater 2 includes a flow limiting valve 24 for restricting inlet flow 11. The flow limiting valve 24 controls the flow rate of water entering the water heater 2. Water heater 2 further includes an inlet water temperature sensor 18 to sense the inlet water temperature. The internal recirculating flow circuit 25 facilitates an internal recirculating flow 32 that is merged with the inlet flow 11. This internal recirculating flow circuit 25 includes an internal recirculation modulating valve 35 and a check valve 30. Check valve 30 permits recirculation from outlet 12 end of water heater 2 to inlet 10 end and stops any flow from inlet 10 end to outlet 12 end of water heater 2 while the internal recirculation modulating valve 35 modulates the magnitude of internal recirculation flow 32 in a predetermined fashion.

The external recirculating flow circuit 27 comprises an external recirculation modulating valve 37 that modulates the magnitude of external recirculation flow 37a. Flow circuit 27 includes an external recirculation check valve which permits only the flow of water from the heated outlet via the external cold water supply line back to the inlet of the heated, and a cold water point of demand 67 attached thereon.

Continuing to refer to FIG. 1, the inlet water temperature sensor 18 is placed upstream of the point where internal recirculating flow 32 and water flow from inlet 10 converge. The water heater 2 preferably includes a flow sensor 26 that is disposed upstream from the point where the internal recirculating flow 32 and water flow from inlet 10 converge. Temperature sensor 39 is placed at this point of convergence.

The water heater 2 has a primary heating element 9. In the embodiment depicted in FIG. 1, primary heating system 8 comprises a burner 34, a blower 36, a fuel supply valve, and a heat exchanger. The heat exchanger transfers heat from the burner 34 to the water flow. Preferably, the blower 36 is used in conjunction with the burner 34 to enhance mixing of the fuel with ambient air prior to combustion. The blower 36 can also enhance convectional heat transfer by forcing the hot flue gas to distal end of the heat exchanger 61 from burner 34.

Upon passing through the heat exchanger, the heated water enters a mixing buffer tank 15. The mixing buffer tank 15 serves as a reserve supply of warm water to ease excessively cold or warm water during transience. Preferably, mixing buffer tank 15 contains a secondary heating system. An immersion heating element is beneficial in this application. In the embodiment depicted, an electrical heating coil is used as a secondary heating element 16. When water flow at first demand point 66 exists, the flow from mixing buffer tank 15 can exit outlet 12 and/or it can recirculate. The water heater 2 can include outlet temperature sensor 22 at outlet 12 of the water heater 2. A decrease in temperature as indicated by outlet temperature sensor 22 over time can be used to detect a small flow.

A typical flow sensor requires a minimum flow in order to start registering a flow rate. However, a particular advantage is realized when a differential pressure switch 48 is utilized to detect a low flow condition such that it effectively covers the range of flow the flow sensor 26 is unable to detect. Specifically, flows greater than 0.005 gpm can be detected with this arrangement. It is to be understood that differential pressure sensors that detect pressure and flows greater or lower than 0.005 gpm can be suitably used with the present invention. A detected flow causes primary heating element 9 and secondary heating element 16 to turn on and water to be recirculated in order to maintain the desired outlet temperature.

Recirculation alone, or recirculation with heating, also prevents freeze and may be activated with or without the detection of a flow. Recirculation and heating may also be programmed to start at a user-specified regular interval for a user-specified duration using a timer, or the like. Alternatively, the program may be set according to learned interval and duration. In a learning system, water usage data such as the time stamp and duration of a demand and the volume of water demanded is collected over time and analyzed. As a result, recirculation and heating can be automatically turned on to anticipate periods of high demand. In addition to providing freeze prevention, automatic activation of recirculation and heating minimizes delays of temperature response to a demand.

When a large amount of hot water is abruptly demanded, buffer tank 15 may not be capable of supplying the amount of hot water demanded. A buffer tank bypass three way valve 56 is provided to give water heater 2 the capability of supplying heated water directly to the point of use at the desired temperature. When the use of buffer tank 15 is desired, buffer tank bypass three way valve 56 is controlled such that bypass flow 44 is ceased. Conversely, if bypass is desired, the buffer tank flow 54 is ceased.

Continuing to refer to FIG. 1, water heater 2 further comprises an expansion tank 42. Fluid expands as it is heated, causing pressure in the water heater flow system to rise. Inclusion of expansion tank 42 provides a particular advantage in accommodating this fluid expansion and may be mounted any location in the fluid flow system which experiences fluid expansion. In another embodiment not shown, the function of an expansion tank is incorporated into the buffer tank 15, eliminating the need of an independent expansion tank. In the illustrative embodiment, expansion tank 42 is mounted at inlet 10 end of water heater 2.

Figure 2:
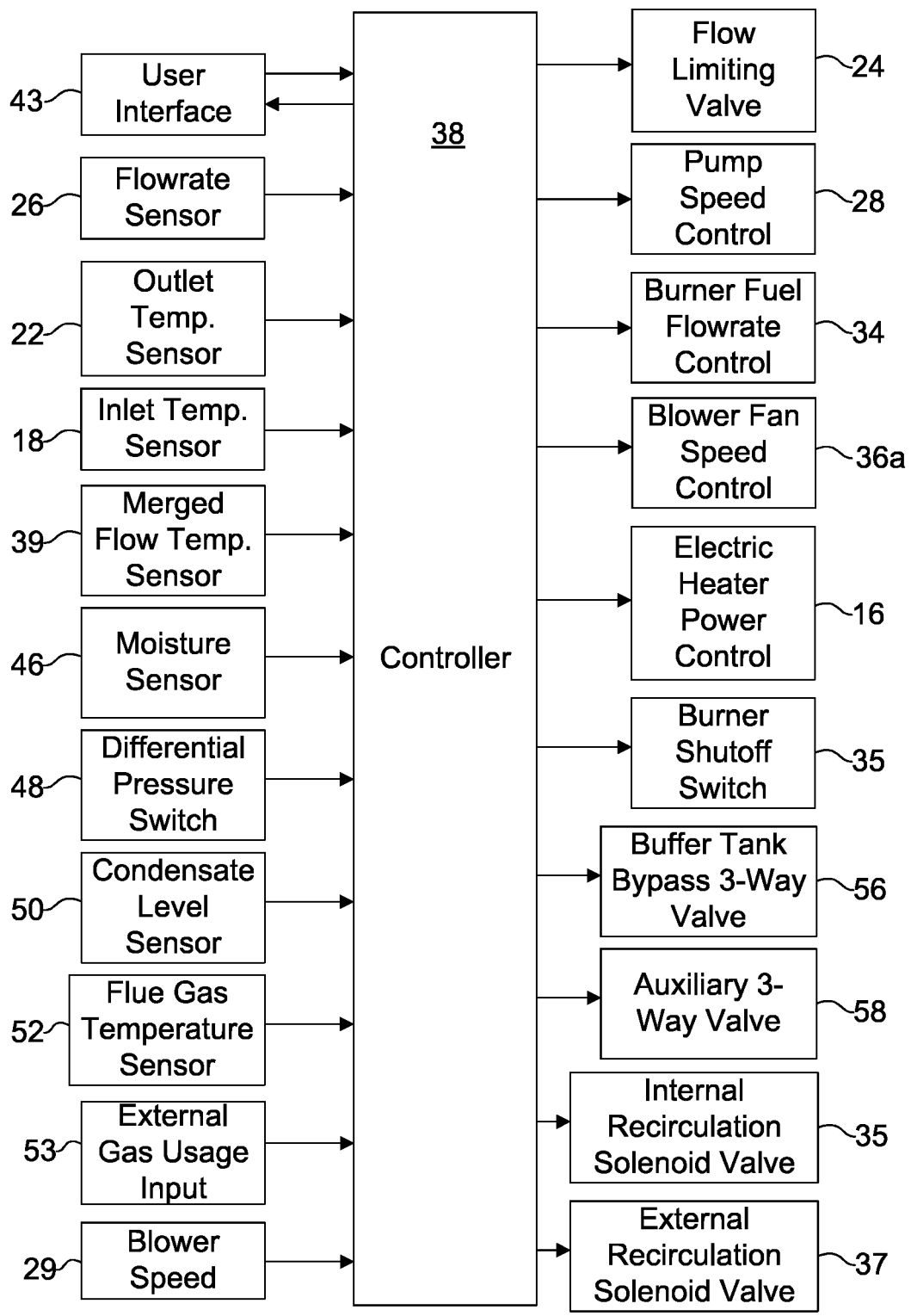
FIG. 2 is a schematic block diagram of a preferred embodiment of a water heater controller of the water heater system of FIG. 1.

FIG. 2 is a generalized block diagram of the water heater controller of the water heater 2 of FIG. 1 depicting the inputs and outputs to controller 38. At the heart of the water heater controller is general purpose controller 38, the comprehensive unit capable of receiving electrical signals, for example from sensors and switches, performing computations based on the signals and outputting electrical control signals as a result of the computations to actuate certain electrical or electro-mechanical components. In the present invention, controller 38 receives a plurality of sensor inputs and outputs a plurality of control signals to perform water heating control.

Referring to FIG. 2, user interface 43 is depicted as a bi-directional communication tool for a user to enter preferences manually or automatically provide control inputs from a second control device. User interface 43 also functions as a display for pertinent water heater 2 information or to provide control output to a second control device. Flow sensor 26 provides flow rate to controller 38 indicating user hot water demand from first demand point 66. In a system with multiple demand points, this flow rate could indicate the total flow rate of all of the demand points.

Outlet temperature sensor 22 provides a signal corresponding to the water temperature at outlet 12 of water heater 2 of a water pipeline leading to first demand point 66. In a system with multiple demand points, there is provided an outlet temperature sensor 22 for each outlet.

Inlet water temperature sensor 18 provides a signal corresponding to the water temperature at water heater inlet 10 of a water source. Preferably, moisture sensor 46 is mounted in the cavity of water heater enclosure 4, and provides a signal corresponding to the humidity in the cavity of water heater enclosure 4. This provides a significant advantage over the prior art in that a means for leak detection in the enclosure is provided. A differential pressure switch 48 provides a signal indicating the presence of a small demand from first demand point 66 in the water heater 2. A condensate level sensor 50 provides a signal indicating whether the condensate resulting from the condensing heat exchanger is draining properly. This provides a significant advantage over the prior art in that it provides a means for corrosion control and preventing overflow and the resulting mess. A flue gas temperature sensor 52 provides a signal corresponding to the flue gas temperature. An excessive flue gas temperature or temperature rise rate causes the controller to de-rate the burner to avoid potentially unsafe operation due to fire hazards and damage to the water heater 2. The means of detecting excessive heat is a significant advantage over the prior art by providing a manner to enhance safety and prevent equipment damage.

A control output is provided to control the water flow rate through the water heater 2 via a flow limiting valve 24. A control output is provided to control pump 28 speed. In one embodiment, the pump is a single speed pump. A control output is provided to control fuel flow rate of burner 34. A burner 34 is immediately lit when fuel is admitted at the burner 34. If the fuel valve is opened and a flame is not lit within a predetermined period of time (e.g., due to failed sparking or absence of fuel flow), the fuel valve will be shut off and retried after a predetermined period. A control output is provided to control a blower 36 fan speed. The blower 36 fan is used in conjunction with burner 34 in order to cause maximum heat transfer from burner 34 to the external surfaces of the heat exchanger. Blower 36 fan may also be turned on independent of burner 34 such as in the case where heat loss is desired of the heat exchanger tubes. Blower 36 speed control is further enhanced by the use of blower speed feedback 29.

A control output is provided to control the power output of a secondary heating element 16, in this case, an electric heating element. This electric heating element is used when the burner 34 is incapable of achieving the heating response desired independently or when burner 34 is incapable of providing a low heat rate. In one embodiment, the burner shutoff switch and the fuel shut off switch are a single integral switch unit. During low flow, the primary heating element (the burner) does not engage. When the flow is slightly above the level the secondary heating element (electric coil) can handle alone, pulse firing of the primary heating element will commence. Once the flow reaches a predetermined limit, the blower will be modulated to correspond to the flow demand. During periods of transience in flow, where the blower may be slow to respond, the secondary heating element will provide instantaneous, but limited, heat to the water.

A control output is provided to modulate the amount of fluid flowing through buffer tank 15. A buffer tank bypass three way valve 56 is used to divert flow from buffer tank 15 when the demand for hot water cannot be met by the water in buffer tank 15. The diverted water flows directly from the heat exchanger to the point of demand, avoiding cooling that occurs upon mixing with cooler water stored in buffer tank 15. A control output is provided to modulate the recirculation flow rate and the flow rate through an auxiliary heat sink such as in the case of a radiant floor heating. In situations where water is in an overheated condition, an auxiliary heat sink can help achieve a specific water temperature output by diverting excess thermal energy to an auxiliary heat sink.

A control output is provided to modulate the flow magnitude through the internal and/or external recirculating flow circuits 25, 27. The placement of pump 28 in the main flow path enables one or both of the recirculating flows.

Figure 3:
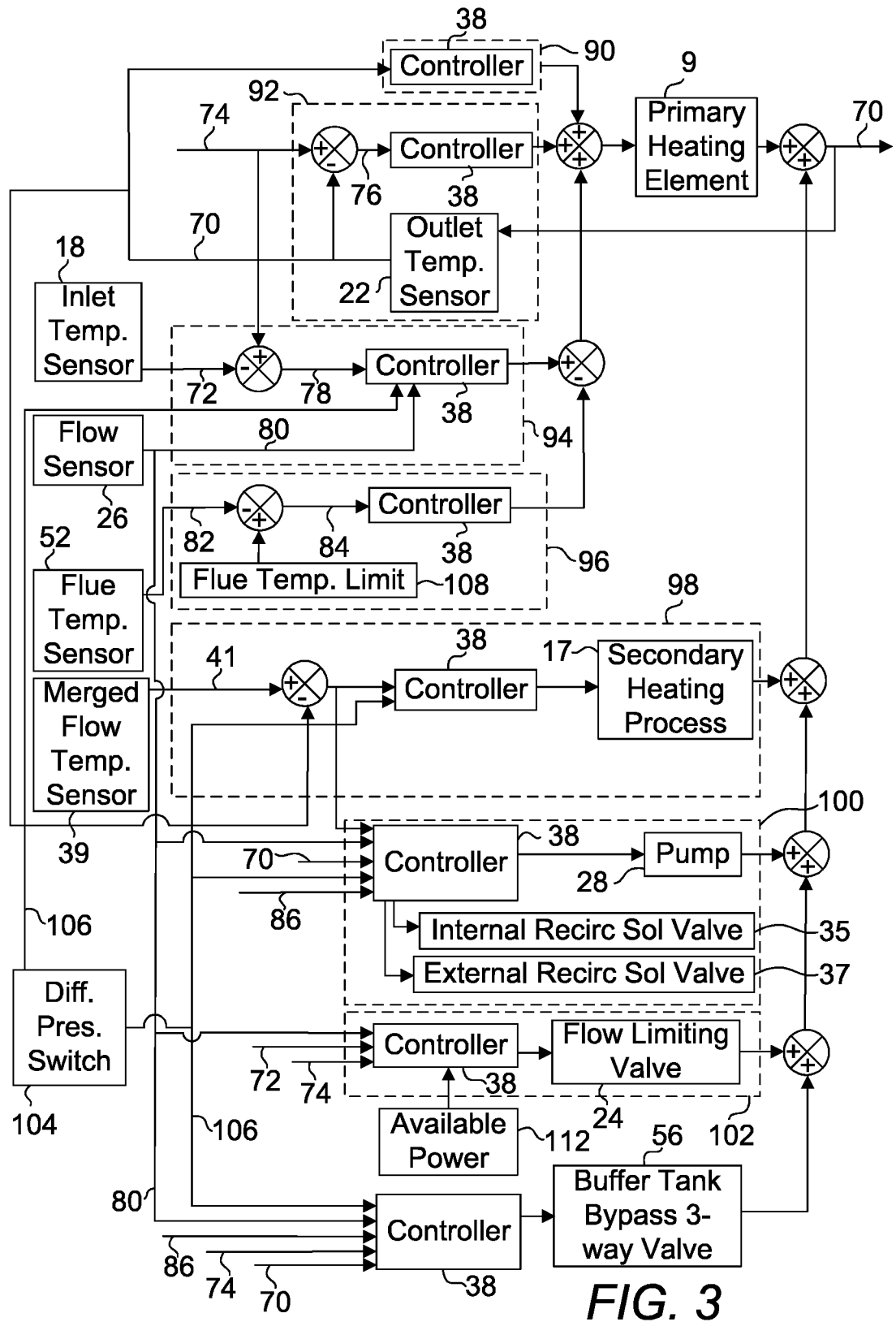
FIG. 3 is a schematic controls diagram of the water heater controller.

FIG. 3 depicts a controls diagram for the current invention. It is to be understood that even though not all inputs are shown for each control portion, it is the intent of the inventors that one or more of the omitted inputs may be used in the control system. The current diagram as it is shown represents a simplified controls diagram depicting major control inputs affecting each control portion. The rate of change of each input is also omitted since time domain is inherent in any control systems.

Referring generally to FIGS. 1 and 2, and more particularly to FIG. 3, the outlet water temperature is controlled by varying the output of flow limiting valve 24, primary heating element 9, secondary heating process 17, pump 28 and three way valve 56. Primary heating element 9 represents the heat source provided by the combination of a blower 36 and a burner 34. Controller 38 comprises several distinct control portions. Each control function 90, 92, 94, 96, 98, 100, 102 is depicted in a distinct block diagram in FIG. 3. Each controller 38 within a control portion represents a control methodology responsible for driving one or more hardware components. Each control methodology can include a control method such as a Proportional Integral Derivative (PID) control or a component of this control method such as the Proportional portion, the Integral portion, the Derivative portion or any combination of these components. Each control methodology can also include a fuzzy logic control. The output of each control portion contributes to the water heating rate of the water heater 2 and therefore the outlet temperature 70.

In the exemplary embodiments, the control system includes main control 94 which is responsible for driving outlet temperature 70 quickly towards desired temperature 74. It can be thought of as the control portion that brings outlet temperature 70 to desired temperature 74 at steady state. Main control 94 compares inlet temperature 72 and desired temperature 74 and calculates a corresponding heating control output based on the difference 78 in the inlet temperature 72 and desired temperature 74. Main control 94 also receives a flow rate 80 and calculates a corresponding heating control output based on flow rate 80. In addition, main control 94 takes the differential pressure signal 106 between the inlet and outlet flow as an indication of the presence of a flow. The magnitude of a demand is indicated by the combination of both flow rate 80 and differential pressure signal 106. A small demand is indicated by a differential pressure only, while a large demand is indicated by a combination of a differential pressure as registered on differential pressure switch 104 and a flow rate as registered by flow sensor 26. As flow rate increases, the intensity of burner 34 is increases. Conversely, as flow rate decreases, the intensity of burner 34 is also decreased. Under certain conditions, burner 34 can be turned off. Recirculation is provided and functions to remove residual heat from the heat exchanger.

The control system further includes feedback control 92, which is responsible for mitigating transience and also ensuring that outlet temperature 70 is driven towards desired temperature 74 and meets desired temperature 74. Feedback control 92 compares the desired temperature 74 and outlet temperature 70 and calculates a corresponding heating control output based on temperature difference 76 between the desired temperature and the outlet temperature.

The control system further includes feedforward control 90 which is responsible for mitigating transience and also ensuring that outlet temperature 70 is driven towards desired temperature 74 by applying a heating control output based on outlet temperature 70. Feedforward control 90 receives the outlet temperature 70 and calculates a corresponding heating control output based on the magnitude of outlet temperature 70.

The control system further includes recirculation control 100 which comprises an internal recirculation control and external recirculation control features. Internal recirculation control is primarily used for mitigating transience and aids in mitigating freeze hazards. External recirculation control eliminates the issue related to the cold column trapped between the heater and a point of demand. Additionally, external recirculation functions to reduce the delays associated with supplying hot water from the heater to a point of demand. Recirculation is provided by a pump 28 in combination with either internal modulating valve 35 or external 37 modulating valve, and is used when a buffer tank 15 flow exists as permitted by buffer tank bypass three way valve 56. When outlet temperature 70 approaches substantially the merged flow temperature 41 as measured by temperature sensor 39, recirculation is turned on in conjunction with buffer tank 15 to avoid potential overshoot in the situations where flow rate is suddenly decreased or stopped.

The control system 102 further includes a flow limiting valve and an available power 112 calculator, the calculator provides an estimate of available power based on the sum total of the power ratings of each of the system's heat sources. The power requirement is the power required to take the water with a flow rate 80 from an input temperature 72 to a desired temperature 74. If the power requirement exceeds that of the available power calculated by available power 112 calculator; controller 38 calculates a flow rate which would result in a power requirement meeting the available power 112 and controls the flow limiting valve to provide this flow rate.

The control system further includes a buffer tank bypass three way valve 56, wherein the valve provides the ability to meet a user demand in the situation where the temperature at buffer tank 15 or at the outlet is not sufficiently hot. Controller 38 determines whether outlet temperature 70 is high enough to meet a user demand by comparing the desired temperature to the outlet temperature 70 and buffer tank 15 temperature. If the desired temperature is higher than either the outlet or buffer tank 15 temperature, the controller further determines whether buffer tank 15 flow needs to be reduced. If the outlet temperature is larger than buffer tank 15 temperature, the valve port connected to buffer tank 15 will be closed or reduced effectively closing or reducing buffer tank 15 flow and the valve port connected to buffer tank bypass line 45 will be opened or increased in order to divert all or allow larger flow through buffer tank bypass line 45. By bypassing buffer tank 15, all heated water is delivered directly and expediently to first demand point 66 without having been mixed with cooler water in buffer tank 15. As a demand persists, bypass flow 44 will be gradually decreased and buffer tank flow 54 increased so as to increase the ability of the heating system to handle transience as buffer tank 15 will store sufficient heated water to buffer any temperature fluctuations due to a sudden increase or decrease in demand.

Figure 4:
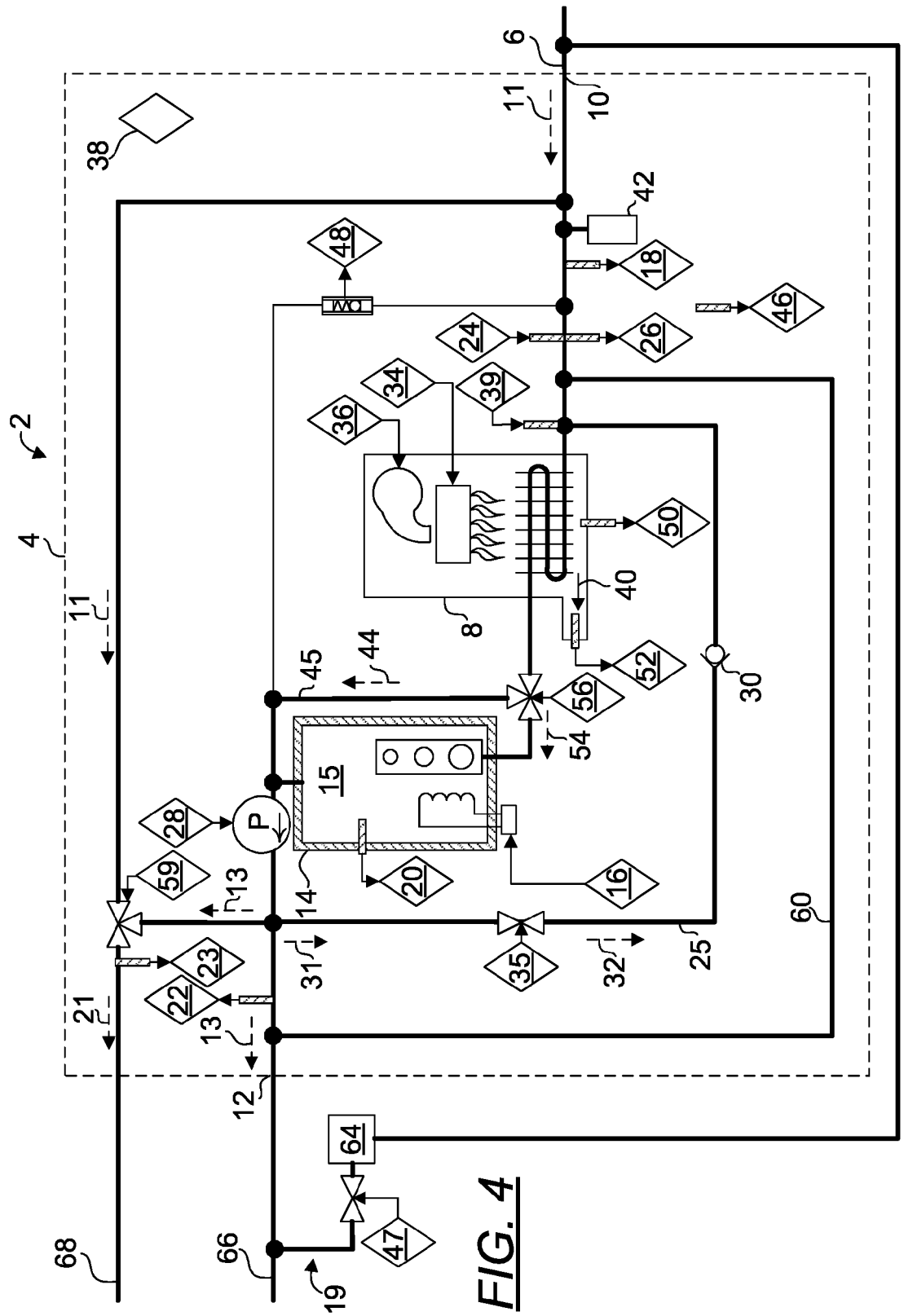
FIG. 4 depicts an alternate embodiment of a water heater.

FIG. 4 depicts an alternate embodiment of water heater 2 configured to provide hot water for a variety of applications. In this embodiment, water heater 2 is connected to a second demand point 68 via an auxiliary three way valve 59. A second outlet temperature sensor 23 provides water temperature at second demand point 68. In this configuration, heated flow 13 is mixed with inlet flow cold water to achieve a desired temperature specified for second demand point 68. Mixed flow 21 to second demand point 68 is a merged flow of heated 13 and cold water inlet flow. Controller 38 determines the positions of three way valve 59 ports for mixing the correct amounts of heated and cold water to achieve the desired temperature. The need for having an additional water outlet at distinct temperatures is solved by providing a three way mixing valve and a temperature sensor operably connected to water heater controller 38. The temperature to each water outlet is user definable. For example, the water line connected a dishwasher could be set to 140 degrees Fahrenheit while the water line connected to a shower could be set at 105 degrees Fahrenheit and the water line connected to a hydronic heating system could be set at 160 degrees Fahrenheit.

Referring again to FIG. 4, an external auxiliary device circuit 19 is provided. In this embodiment, auxiliary heat sink 64 (e.g. a radiant heat coil), incorporates a modulating valve 47 wherein modulated heated flow 13 is externally recirculated with the aid of pump 28 and returned via internal recirculation flow 32. In cases where cold water column at first demand point 66 is a concern, such external configuration may also be used to recirculate heated water to first demand point 66 placed at great distance from water heater 2. The problem of long delays to get hot water to the first demand point 66 due to cold water being present in the lengths of pipe between the water heater and first demand point 66 is solved by providing pump 28 to enable external recirculation. Additionally, external auxiliary device circuit 19 can be used to introduce heated water into the hybrid tankless water heating system derived from alternate energy sources such as solar energy, geothermal energy, microwave energy, electric energy, or the like.

Figure 5:
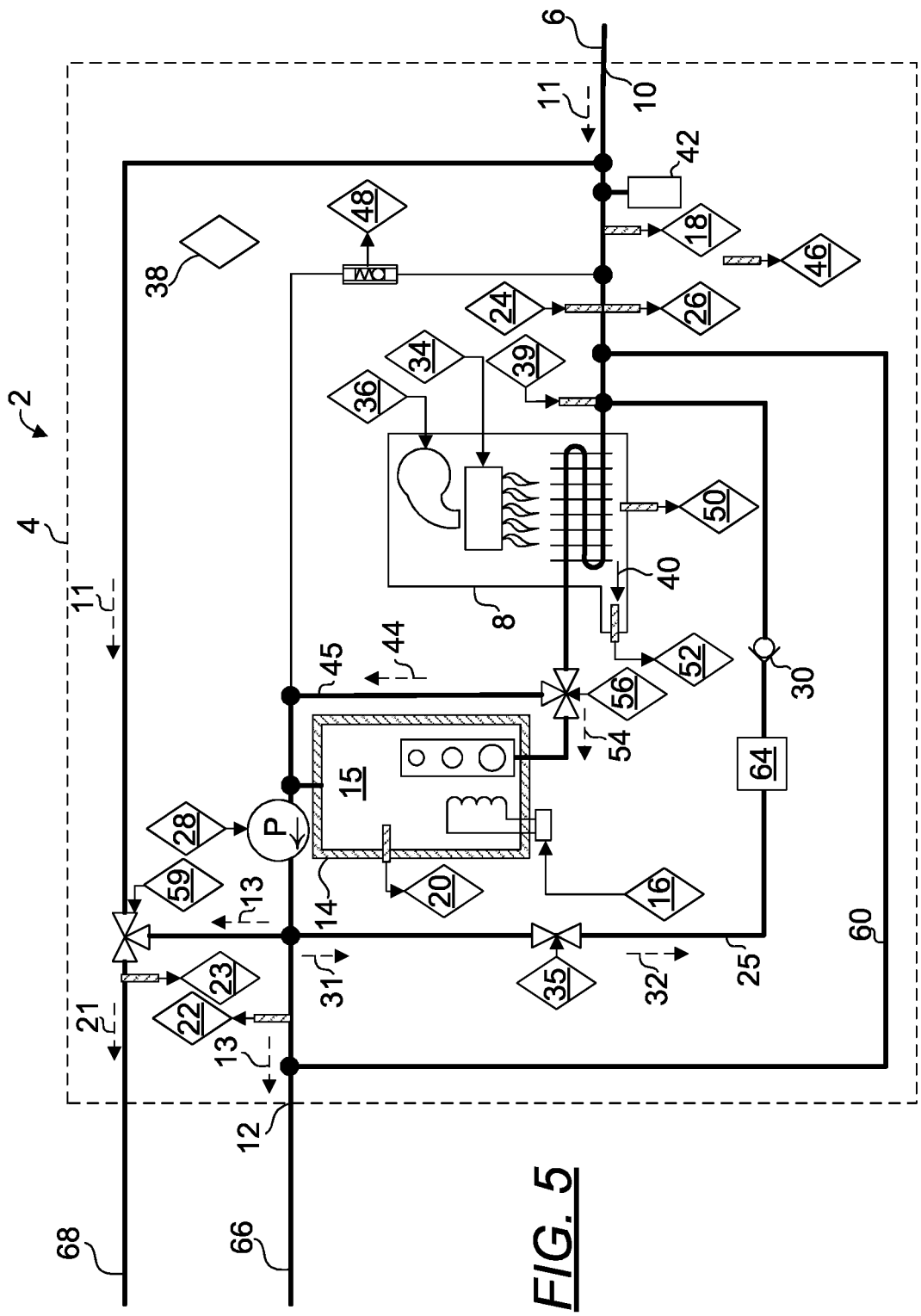
FIG. 5 depicts an alternate embodiment of a water heater.

FIG. 5 depicts another way a heat sink may be connected. In this embodiment, a heat sink such as a radiant heat coil is connected to internal recirculating flow circuit 25. This embodiment provides less flexibility in controlling the heat sink flow since auxiliary heat sink 64 flow is also internal recirculation flow 32.

Now that an exemplary embodiment of the present invention has been described, focus will be turned to a discussion of the novel features and advantages provided. Many drawbacks and limitations of the prior art have been overcome by the present invention.

By placing buffer tank 15 downstream from the primary heat exchanger variations of actual outlet temperature from a desired outlet temperature can be reduced. Referring to FIG. 1, buffer tank 15 receives heated water at its inlet from the exit port of the heat exchanger that is receiving heat from a burner 34. In one mode of operation, the water flowing through buffer tank 15 is delivered to first demand point 66. In another mode of operation, a portion of the water flowing through buffer tank 15 is delivered to first demand point 66 and the remaining portion is recirculated to the inlet of the water heater. The recirculated water is merged with incoming cold water at the inlet, resulting in a flow into the heat exchanger that is at a higher temperature than the incoming cold water. The water temperature exiting the heat exchanger can fluctuate due to variable heat rate provided by burner 34 during operation. When the water flow with fluctuating temperature enters the buffer tank, the incoming flow mixes with the existing buffer tank 15 water, thereby lessening the impact of any sudden changes in temperature of the incoming flow and resulting in water flow that is more uniform over time.

The current buffer tank 15 placement differs from prior art water heater systems where buffer tank 15 is mounted upstream of the heat exchanger. In the prior art configuration, a forced recirculation is necessary to effectively mix a heated flow with the cold incoming water, necessitating the utilization of a recirculation pump. Since buffer tank 15 is placed downstream from the heat exchanger in the current invention, no forced recirculation is necessary to realize the benefit of buffer tank 15 during portions of the water heater operation. Thus, the problem of minimizing variation of actual outlet temperature from a desired outlet temperature in a fluid control system is solved by disposing a buffer tank 15 downstream of the heat exchanger in a fluid heating system.

Another drawback with current on demand water heaters is an undesirable and inconvenient delay for the user to receive water in the desired temperature range. The delay associated with obtaining the hot water at the desired temperature is related to the temperature of the cold water input feeding the water heater. The delay can be attributed to the corresponding heat transfer from the burner to the contained water located within the heat exchanger tubes. A byproduct of the delay results in a user avoiding the cold initial water flow resulting in waste of both time and water. By way of illustration, most users taking a shower will wait to commence use of the water until the temperature reaches (increases to) a certain comfortable range. The flowing water, as well as the user's time, is wasted as the cooler water flows down the drain waiting for the flowing water to reach desired or target temperature.

A second heating source, when placed inside a reservoir of water such as the stored water in buffer tank 15, enables the water heater to quickly meet the sudden increase of a sizable hot water demand by quickly raising the water temperature in buffer tank 15 so that water can be delivered to the user at desired temperature. In one embodiment, an immersion electric heater is used as secondary heating element 16. A secondary heating element 16, e.g. an electrical heating element, transfers heat by conduction to the water surrounding its coil. Unlike a burner-heat exchanger arrangement, the heating source of secondary heating element 16 comes in direct contact with the water and can therefore transfer heat more efficiently to the water.

A second heating source also provides fine heating modulation which is lacking in a primary heating source. Fine tuning the outlet fluid temperature is achieved by providing primary heating element for coarse adjustment to the inlet fluid temperature and further providing a secondary heating element for fine adjustment to the inlet fluid temperature.

Overshoot in outlet temperature response is minimized by providing a secondary heating element 16 with variable heating power at low heating rate, and/or a mixing valve and/or a capillary bypass line 60. By way of illustration, the secondary heating element 16 (e.g., electric heating coil) is used where ambient temperature is over 70 degrees F. Primary heating element 9 (e.g., burner) provides coarse adjustment and secondary heating element 16 provides fine adjustment to the inlet temperature. A decrease in demand causes excess heat stored in the heat exchanger tubes to be transmitted to the fluid due to the temperature gradient favoring heat transfer from the tubings to the fluid. Buffer tank 15 holds ample amount of water to be recirculated in order to dissipate the excess heat once heating has ceased. A mixing valve mixes overly heated fluid with fluid at a lower temperature, quickly reducing a potential overshoot in the outlet temperature to a safe temperature.

Capillary bypass line 60 operably connecting the cold fluid inlet and the hot fluid outlet allows fluid flow from the high pressure side (i.e., cold side) to the low pressure side (i.e., hot side) causing the overly heated fluid to be mixed with the colder fluid.

Delayed temperature response is also minimized by proactively maintaining the outlet temperature during pre-set periods of water usage or predicted periods of water usage. In the present invention, there are set time periods in a day at which the outlet temperature will be controlled to the desired temperature to avoid both firing and transient delays. During these periods, the water will be heated, stored in the buffer tank and recirculated. The user may preprogram periods of a day in which high water usage is expected via user interface 43. The user may also select a mode where the controller, through collection and analysis of water usage data over a period of time, automatically determines periods of high usage and maintain outlet water temperature at desired temperature.

When a water demand detected, delayed temperature response is solved by proactively recirculating fluid for initiating the primary heating element. The rapid detection of a growing demand by differential pressure switch 104 causes burner 34 to turn on even when the flow (say between 0.005 and 0.5 gpm) has not risen above the flow sensor 26 detection threshold (typically 0.5 gpm), thereby shortening the time it takes to achieve the desired outlet temperature.

Current tankless water heaters start controlling to desired temperature by detecting a flow condition. Typically, a minimum flow threshold of 0.5 GPM is required to turn on the burner. If a demand fluctuates above and below the minimum threshold, the water will be heated only during portions of the demand resulting in water temperature not meeting the desired temperature. In order to detect a small flow, a prior art method uses a difference in temperature between the inlet and outlet ports of a buffer tank 15 or the rate of drop of the inlet port temperature and outlet port temperature to indicate a flow condition. The use of this indication may be erroneous since the temperature differential between the inlet port and outlet port of buffer tank 15 does not necessarily indicate a flow demand. Another prior art method to detect that a demand exists in a buffer tank involves sensing the temperature drop in either the inlet port or outlet port. This method often results in erroneous demand indication. Therefore, utilizing these indicators may cause the water heater to warm the tank water unnecessarily.

Typically, a minimum flow threshold of 0.5 GPM is required to indicate a demand to cause the burner to turn on. In prior art tankless water heaters, since water is heated only when the minimum flow threshold is met, there will be no heating when the flow demand does not rise above the minimum threshold. This flow condition below the minimum threshold is called the dead zone. In the present invention, a small flow is detected using a differential pressure switch 48, wherein the switch is capable of detecting a flow greater than 0.005 GPM. The detection of a small flow causes secondary heating element 16 to turn on, thereby keeping the outlet water warm. Thus, the problem of dead zones is solved by utilizing a differential pressure switch capable of detecting a small flow for initiating a heating element.

Variance between desired outlet fluid temperature and actual output fluid temperature is reduced by providing supplemental heat via a secondary heating element 16. The need to respond quickly to a hot water demand causes the controller to fire the burner at high rate in order to meet a heating demand. Firing the burner at high rate causes water to warm up quickly. However, the heat exchanger tubing material can store excess heat and reach a high temperature. When the desired temperature is about to be reached, the burner is turned off to avoid or reduce outlet temperature overshoot. If the burner is turned off too early, the outlet water temperature will not reach the desired temperature quickly. If the burner is turned off too late, the risk of overheating the water is greater. Even after the burner is turned off, the excess heat stored in the heat exchanger continues to cause a positive temperature gradient between the heat exchanger tubes and the water flowing through them, thereby causing the heat exchanger to maintain the previously induced burner heating rate even while the burner has now been turned off. If the outlet water temperature can no longer meet the desired temperature, the burner is again turned on. This frequent turn-on and turn-off of the burner causes the undesirable phenomenon called hunting, i.e., the outlet temperature fluctuates about the desired temperature even in steady state. With the use of secondary heating element 16 (e.g. electric heating element) in conjunction with burner 34 (primary heating system 8), water heater 2 can react quickly to a water demand by firing burner 34 to heat the inlet water quickly while reducing overshoot. Secondary heating element 16 is capable of providing a small heat rate that complements the heat rate produced with normal burner 34 operation and pulse firing of burner 34. Secondary heating element 16 minimizes the need for burner 34 to take the outlet temperature very close to the desired temperature before turning off and thereby overcomes temperature overshoot. The problem of excessive heating control hunting especially during periods of trickle or low flows is solved by providing a secondary heating element 16 or pulse firing of primary heating element 9 for fine control of outlet fluid temperature and a means for selecting whether to initiate primary heating element 9, a secondary heating element 16, or combinations thereof.

In prior art water heater systems, a cold sandwich effect occurs when a user briefly turns off a faucet that has been running water of desired temperature for an extended period of time. This brief cessation of demand creates a column of scalding hot water resulting from excess heat transferred to the small quantity of water remaining in the water heater from the heat exchanger thermal mass upon shutting down burner 34. Responding to this high outlet temperature, the controller ceases to provide more heat to the water causing a trailing column of water to be under heated. Eventually when the outlet temperature sensor starts detecting this cold water column due to a resuming demand, heating resumes and a steady state flow with desired temperature is achieved. The problem of the cold sandwich effect in a transient system is solved by recirculating the small quantity of water remaining in the heat exchanger upon cessation of a demand via the buffer tank.

Recirculation causes excess heat to be dissipated and distributed more uniformly throughout the remaining volume of water in the water heater. When a demand restarts, recirculating via buffer tank 15 causes the colder incoming water to be mixed with existing warmer water in the buffer tank to yield water at more uniform temperature over time.

Legionnaire bacteria grow well in stagnant water of from 80 to 120 degree Fahrenheit. Recirculation of outlet flow and maintaining water temperature at elevated temperature of 140 deg Fahrenheit aids in eliminating this dangerous bacteria. In the current invention, the water heater can be programmed to turn on periodically. Recirculation causes heat sources to turn on in order to maintain the outlet temperature at the desired temperature. Thus, the problem of bacteria growth in stored water supplies and water system components is solved by recirculation of outlet flow and maintaining water temperature at elevated temperature of 140 degrees Fahrenheit.

In the current invention, an unconventional heat exchanger is used. The burner 34 is inverted and placed above the heat exchanger tubes in a burner cavity. When the fuel supply line is opened, the blower blows air-fuel mixture down towards the heat exchanger disposed below the blower nozzle. As such, the flue gas has the tendency to rise and it must be forced down towards the heat exchanger by a blower. The heat exchanger is an array of tubes where the heat provided by burner 34 is transferred to the water flowing in the tubes. The heat exchanger is configured such that the exiting water flow portion is disposed closest to burner 34 and the incoming water flow portion is disposed most distant from burner 34.

Prior art tankless water heater systems do not provide for an alternate power source during primary power outage. In the current invention, an alternate power source is provided and automatically sourced should a primary power loss to the water heater system occur. Thus, a preferred embodiment provides and automatically sources a secondary onboard energy source such as a backup battery or an inline hydro generator capable of generating electrical power from hydraulic power. By continuously providing power to the water heater in the event of a primary power loss, freeze protection is provided, giving enough time for the user to either drain the water heater system or provide additional and continuous backup power. In addition, continuous operation of the water heater system also allows for temporary hot water usage.

The problem of overheating (temperature spikes) of water during a rapid reduction (step down and completely off) in demand is solved by actively re-circulating the water, cutting down heat input, and in some cases by turning the blower to a maximum speed without flame. This is achieved by detecting a change in flow demand, starting the recirculating pump, lowering or shutting off firing of the burner and turning on the blower. Thus, transient temperature spikes are reduced by means of controlling a blower that can optionally operate independent from the burner and a recirculation pump.

In the current invention, detection of a leakage between the water inlet and water outlet of the water heater is accomplished with a moisture sensor that alarms when excessive moisture is detected in the cavity of the fluid heater inside the water heater enclosure. This sensor is capable of sensing a leak that occurs within the water heater enclosure.

In the current invention, leakage from external plumbing operably connected to the water outlet is detected and/or ceased by providing a differential pressure switch operably connected to the inlet end and outlet end of the water heater. This differential pressure switch detects a small flow condition by registering a pressure differential between the two ends of the water heater over a period of time. If this period exceeds a preset leak time threshold, a leak condition is raised and a warning is issued to the user and/or the flow control valve is moved to the closed position.

In the current invention, a small leak or an open faucet for long periods of time will be detected via a pressure difference as registered by a pressure differential switch over an extended period of time as specified by the user. For example, a continuous detection of a pressure difference over a period of 30 minutes may indicate a leak.

In the current invention, detecting leakage downstream of the flow sensor is achieved by providing a flow sensor to detect the actual amount of flow and compare such actual amount of flow to a known quantity of water programmed to be delivered such that when the difference exceeds a predetermined fault threshold, a leak condition is raised. Upon detecting a leak condition, a warning is issued to the user and the flow limiting valve is shut to stop further water loss.

Freeze hazards are minimized in the present invention by periodically maintaining water temperature at a level higher than the freezing point. The current invention periodically recirculates flow even without an external user demand. This recirculation may occur at preprogrammed or learned usage periods and monitoring the heater inlet and outlet temperature or their rate of change such that when the outlet or inlet temperature drops below a certain threshold, or if the rate of temperature drop exceeds a certain threshold, recirculation and/or a secondary heating element 16 is initiated. Similarly, when the outlet or inlet temperature drops below a certain threshold or if the rate of temperature drop exceeds a certain threshold, a secondary heating element 16, combined with pulse firing of primary heating element 9, as well as recirculation, are initiated.

Detecting trickle flow or low flow at any given time is accomplished by using a differential pressure switch. A differential pressure switch is operably connected to inlet 10 and outlet 12 ends of the water heater. The switch is in the off position when there is no flow in the water heater. A flow in the water heater creates a pressure differential between inlet 10 and outlet 12 ends, thereby moving the differential pressure switch to the on position. The pressure differential switch is preferably capable of detecting flow greater than 0.005 gpm or a range of flow not detectable in a flow sensor.

Prior art buffer tank 15 temperature based water heater control systems rely on the temperature difference between buffer tank 15 inlet temperature and buffer tank 15 outlet temperature to indicate a need to turn on a heat source. In the present invention, the entire range of flow demand is detectable by using the differential pressure switch and the flow sensor. Since the temperature difference between buffer tank 15 inlet and outlet is not required, only one temperature sensor is required for buffer tank 15, provided that inlet buffer tank 15 flow is mixed well to yield a uniform water temperature throughout buffer tank 15. This provides an advantage over the prior art using multiple temperature sensors in the controls scheme. Temperature variations within buffer tank 15 are minimized by having baffles or a barrel-hole style inlet system for creating turbulence which promotes mixing of the incoming water with existing water in the tank, enabling the use of a single temperature sensor representative of the entire buffer tank 15 temperature.

In the prior art, the need for a forced recirculation is indicated by a drop in the buffer tank inlet temperature. In this prior art configuration, heating is tightly coupled with the presence of a recirculating flow and heating would not occur until force recirculation has been activated. In the present invention, no forced recirculation is necessary to initiate heating. When a demand exists as indicated by the differential pressure switch and the flow sensor, a high firing rate of burner 34 combined with recirculation, meets the hot water demand in a short time without having to unnecessarily warm water stored in buffer tank 15 for an extended period of time. Thus, the problem of long duration necessary to heat up water to the desired temperature is solved by actively recirculating the water and by deliberately increasing the heat input (higher firing rate) for a predetermined duration upon detecting a flow demand. This provides a significant advantage over the prior art since temperature control is enhanced during transience and startup flow conditions.

In systems relying on the water temperature in buffer tank 15 as a leading indicator to trigger heating, much of the heating is wasted when there is no actual demand. However, with a system relying on the differential fluid pressure between the inlet and the outlet ends and flow sensor to indicate demand, heating would commence only when there is an actual flow unless it is programmed to do so otherwise. Also, temperature is a lagging indicator in that it takes longer for temperature to change to indicate a change in demand whereas a heating system based on the presence or magnitude of a flow indicates a change in demand immediately so that this change can be acted upon immediately thereby improving the heating response time. Thus, the goal of maintaining outlet temperature is achieved by using a differential pressure and a flow rate as leading indicators in the present invention.

When hot water is first requested, a motorized three way valve closes the flow path to the buffer tank, thereby bypassing it and diverting all heated water to the point of use. As the burner keeps up, the three way valve slowly diverts the flow through to buffer tank 15 and maintains a portion of the flow in the bypass line. Thus, the long duration necessary to heat water to the desired temperature is eliminated by bypassing the buffer tank 15 during startup and increased demands so that undiluted hot water can be delivered to the point of use without having been mixed with cooler water in the buffer tank.

Water hammer occurs when a user suddenly ceases water demand by closing a valve creating pressure surges. A capillary bypass line 60 can absorb the pressure surges, mitigating the damaging effects of water hammer. Thus, the problem of high pressure spikes is minimized by using a dedicated capillary bypass line 60 operably connected to the inlet and outlet ends of the water heater.

The minimum power output of burner 34 is typically 20,000 BTU/hour (with a modulation range of 10:1 (turn down ratio) and a burner size of 200,000 BTU/hour). In order to achieve a lower average power output, pulse firing is used. In pulse firing, the burner power is modulated such that in a pulse cycle, burner 34 is turned on for a preset duration and turned off or turned down to a lower setting for another preset duration. The average power is the average power of each cycle. Thus, the problem of inadequate low firing rate or minimum firing rate constraint is solved by pulse firing burner 34 (with constant blower operations).

As the water heater ages, various components of water heater 2 may break down and require repair or replacement to ensure proper operation of water heater 2 and to avoid safety hazards. Scaling may develop in the interior surfaces of the flow tubes of water heater 2. Inadequate recirculation can be a sign of pump breakdown. The ability to detect a failed pump is provided by detecting excessive flue temperature and flue temperature rise rate. This provides a significant advantage over the prior art. A service alert can be issued when such a condition is detected. Thus, pump failure or inadequate recirculation flow is detected by monitoring the flue out temperature and its rate of change to proactively managing the heat input (e.g., powering off the unit). Additionally, the problem of degraded heat exchanger performance is detected by monitoring the flue out temperature and its rate of change, buffer tank or outlet water temperature to proactively inform user to intervene. Under normal operation, the heat provided by the burner is properly transferred to and absorbed by the water flowing through the water heater. Since a good portion of provided heat is recovered, the flue gas temperature should not be excessively high. The flue vent material is protected by monitoring the flue gas temperature and its rate of change to proactively manage heat input.

Most modern water heaters are designed without providing the user or service personnel serviceability. Poorly maintained water heater may need to be replaced prematurely. In the present invention, serviceability is facilitated. Hard water causes unwanted mineral deposits (scaling) on the fluid contact surfaces of the water heater system. Severe scaling can cause severe drop in the water heater efficiency and life span. Scale deposits in the interior surfaces of heat exchanger tubes can reduce the heat exchanger efficiency as the scale deposits reduce heat transfer rate from the exterior to the interior surfaces of the heat exchanger tubes. Therefore, more heat would be required to raise each degree of water temperature. Excessive scale deposits, or any other like issues, that cause reduced heat exchanger efficiency, can lead to overheating of the exterior surfaces of a heat exchanger resulting in a shortened heat exchanger service life. In addition to resulting in damage to the heat exchanger, overheating of the heat exchanger exterior surfaces leads to undue energy loss. The problem of overheat and heat loss of the exterior surfaces of heat exchanger is solved by providing at least a baffle or a structure capable of swirling or mixing pre-combusted air (as provided by blower 36) in the vicinity of the heat exchanger, thereby promoting heat transfer from the exterior surfaces of the heat exchanger to the pre-combusted air and recovering this absorbed heat of the pre-combusted air by redistributing it to colder portions of the heat exchanger surfaces.

There is provided a service access to the hot water system such that a cleaning agent may be introduced in the recirculation circuit and a dedicated service mode such that the recirculation pump may be activated without turning on any heat sources. The prior art does not provide end-user direct access such as this, rather, requires a trained maintenance person to perform such tasks by at least partially taking apart the water heater.

When a problem occurs, a typical water heater diagnostic system provides rudimentary information in the form of fault codes which require further decoding for corrective instructions. A novel feature of the current invention enables an end user of the current water heater to take appropriate steps by providing not only fault codes but also corrective instructions associated with the fault codes. As such, the end user is capable of taking corrective actions without having to wait for service personnel or resort to an instruction manual. In one embodiment, a fault code is decoded by providing speech capability to the water heater, a means of transmitting a spoken fault code by phone to a fault code database, a means for identifying the problem source and its associated corrective procedures based on the transmitted fault code and a means for notifying the user of the corrective instructions. In another embodiment, a fault code is decoded by automatically transmitting a fault code via internet to an off-site database, retrieving corrective instructions based on this fault code, and notifying the user of corrective instructions with text or audible speech instructions.

In the current invention, active and continuous monitoring performance and health of the water heater minimize unforeseen service outages. In one aspect, the controls provide for automatic adjustment of operating parameters based on measured performance. Performance is determined by logging blower rpm, power output and comparing them to nominal values and the water heater's historical data. Additionally or alternatively, prognostic feedback is provided to the user so that a water heater problem can be responded to before a break down can occur. In the event a problem is so severe that it cannot be corrected automatically, the user is timely alerted.

In a condensing heat exchanger, a drip collection pan is used to collect the condensate which is in turn drained with or without pressure assist via a drainage tube to a sump. A blockage in the drainage tube can cause backup or overflow of the condensate and cause corrosion in water heater components exposed to this condensate. A condensate level sensor 50 provides alert and calls attention of the user that condensate drainage is blocked and requires attention. A small pump may also be used to aid condensate drainage. In the case a small pump is used, the need for gravity drainage is unnecessary and therefore the need to mount the water heater at an elevated position to create this gravity drainage is eased. Thus, the problem of flue condensate backup or blockage is detected by using condensate level sensor 50.

Flow sensor 26 as used in this invention is connected to the inlet of the water heater and therefore does not experience elevated temperature. As such, it does not require a more expensive high temperature grade flow sensor. By mounting the flow sensor outside of the recirculation circuit, there is no pressure loss imparted by the flow sensor. This allows the use of a pump with a lower power rating, thereby making the water heater more economical. Additionally, no proprietary valves are required.

When a user first enters a shower, the user may be initially satisfied with a water temperature that is higher than the ambient air temperature. The user will likely demand progressively hotter water as the shower progresses due to user temperature acclimation. Normally, a user demands hotter water by manually increasing the valve controlling the hot water supply. The present invention optionally includes a feature that allows the user to set an automatic temperature rise rate and a high temperature limit that aligns with the user's temperature rate of change profile or acclimation profile; thereby providing a varying temperature service. For example, the initial requested temperature is 90 degrees. The user may choose to increase the water temperature by 1 degree per minute. If the demand is left untouched, the water temperature would be increased to 95 degrees in 5 minutes of usage. If the high temperature limit is set at 92 degrees, the water temperature would be increased only to 92 degrees in 2 minutes and remains at that temperature throughout the rest of the duration of the demand.

Automatic faucets have been in widespread use for some time. In an automatic faucet system, a proximity sensor is used to detect the presence of a demand. When a user approaches the faucet with his or her hands extended into the field of view of the proximity sensor, the faucet is automatically turned on and water is automatically discharged. This will trigger external or even internal recirculation, thus "preparing" the water heater to be ready for anticipated water use. Proximity sensors here are used to detect the presence of a person in the bathroom, sending a signal to the heater and preparing the heater for hot water use.

Natural gas is an energy source or fuel commonly used in residential homes, businesses, as well as industrial settings, appliances and systems that operate on natural gas include HVAC systems, kitchen stoves, clothes dryers, water heaters, and the like. The number of natural gas devices that can be powered simultaneously is a function of the utility natural gas service line(s) maximum capacity compared to the sum of the gas usage rates of the individual devices. A natural gas over-demand situation occurs when the cumulative sum of usage rates from each of the operating natural gas appliances or devices is greater than the maximum capacity of the incoming natural gas service utility line or lines. During such a natural gas over-demand situations, it's common to engage a device's fail-safe system. System fail-safes include flameout or other type of natural gas shut down type routines resulting from inadequate natural gas supply or gas starving.

In one embodiment of the present invention, the undesirable gas over-demand type situations are avoided or reduced in frequency in hybrid tankless water heating systems by utilizing a modulating gas burner where the natural gas consumption rate is reduced, or de-rated. This reduction is accomplished via the modulation of a modulating gas valve and cooperating blower. Controlling the heater in such a manner, results in the reduction of natural gas usage or consumption rate and associated reduction in blower speed by predetermined levels dictated by a controller. The typical hybrid tankless water heating system includes a blower, a burner, and a buffer tank having an auxiliary heating means having an energy source other than natural gas along with supporting hardware. Supporting hardware includes at least one natural gas pressure sensor, can be a hardwired element as well as a wireless version, that is located upstream or in the gas feed line of the hybrid tankless water heating system, and a controller to enable cooperation among the various system elements. Alternatively, a network of gas powered devices can relay their status including usage rates to a controller thereby creating an alternate embodiment without the need for a natural gas pressure sensor (since available gas capacity can be calculated).

In a typical configuration, the natural gas pressure sensor is used to determine the real time natural gas available to the hybrid tankless water heating system, and in conjunction with a controller, is used to detect a natural gas over-demand situation. If such a natural gas over-demand situation is detected or predicted, the controller reacts by de-rating the burner and blower subsystem of the hybrid tankless water heating system. Given a particular natural gas input line geometry (e.g. round pipe inner diameter); maximum flow rates are easily calculated along with corresponding heat output.

Another variation of the present embodiment under discussion is the use of two or more external gas usage sensors or monitors each having an input signal to the controller that provides an indication as to whether or not the gas supply is shared among gas consuming appliances, enabling the calculation of the real time gas supply rate available. If it is determined that the utility natural gas service line is shared by one or more gas consuming appliance, the water heater burner will be de-rated if a natural gas over-demand situation is detected or predicted by limiting the gas valve opening to align with the actual gas supply available at that moment. By having a more accurate burner heat output prediction, the controller is better able to determine whether supplemental heat via the buffer tank to compensate for the reduction of natural gas should be used. In one embodiment, the external gas usage input receives gas pressure sensor measurement from the gas supply line. In another embodiment, the controller wirelessly receives one or more signals indicating the corresponding pressure drop, usage rates, or the like of the other appliance(s) sharing the same gas supply line.

The typical method for reducing natural gas consumption in a hybrid tankless water heating system to avoid a natural gas over-demand situation comprises continuous monitoring of available natural gas pressure along one or more portions of the natural gas distribution network monitoring for potential natural gas over-demand situations. If such a natural gas over-demand situation is detected, a controller reduces the burner natural gas consumption rate and speed of the corresponding blower by predetermined levels such that natural gas consumption rate of the hybrid tankless water heating system avoids the undesirable natural gas over-demand situation.

The following example provides a more detailed analysis of one embodiment. The embodiment includes a modulating gas burner wherein the supply of gas is modulated by adjusting a modulating gas valve connected to the modulating gas burner. Referring again to FIG. 2, there is further provided an external gas usage input signal 53 which corresponds to the rate at which the gas supply is used by external gas consuming appliances such as a furnace. In a typical operating environment, there may be multiple gas consuming appliances, such as a gas furnace, radiant floor heater and water heater burner which source gas from the same gas supply. If all appliances are operating at their respective high or maximum capacities, a condition may exist where the gas supply is incapable of supplying gas to all appliances at normal operating pressure. Under such condition, one or more appliance is said to be starving for gas wherein the actual gas supply rate is below the expected amount. There exists a need in modulating gas supply to the current burner such that the heat output corresponding to the gas supply is quantifiable. The external gas usage input signal 53 provides an indication as to whether or not the gas supply is shared amongst gas consuming appliances and/or what gas supply rate is available. In one embodiment, such indication is provided by a gas pressure reading that is lower than a predetermined level. Upon determination of a shared gas supply, the water heater burner will be derated by limiting the gas valve opening to better reflect the true heat output corresponding to the gas supply. By having a more accurate burner heat output prediction, the controller is better able to determine whether supplemental heat is necessary. In one embodiment, the external gas usage input receives gas pressure sensor measurement from the gas supply line. In another embodiment, the external gas usage input receives a signal indicating the rate or the presence of gas usage of a second appliance sharing the same gas supply. In one embodiment, the external gas usage input is received wirelessly.

When a hybrid tankless water heating system is initially turned on or when a water demand is abruptly increased, there is an initial warm up period where the burner-blower subsystem has to get the heat exchanger up to a temperature that will yield output water flow at the target predetermined temperature. During this warm-up period, if hot water is requested, the temperature of the output water flow will be lower than the desired target predetermined temperature, thus creating undesirable cold water transient.

In one embodiment of the present invention, the length of time or duration associated with undesirable cold water transient is reduced by the incorporation of a water flow limiting valve and a controller functionally connected to said water said water flow limiting valve. This is accomplished by restricting the water flow through the hybrid tankless water heating system or water heater, thereby enabling the delivery of water at the predetermined temperature at a reduced flow rate. Supporting hardware includes at a minimum, an output temperature sensor located at the output of the hybrid tankless water heater for measuring an output temperature, an input temperature sensor located at the input of the hybrid tankless water heating system for measuring an input temperature, a flow sensor for measuring a flow rate requested of said hybrid tankless water heating system and a controller for determining an operating capacity corresponding to the difference between the predetermined temperature and the output temperature, the difference between the output temperature and the input temperature and the flow rate. As a demand capacity increases abruptly, the flow limiting valve is restricted to reduce flow rate such that the output water predetermined temperature is quickly achieved. As the water heater's operating capacity becomes more readily available, the setting of the water flow limiting valve is adjusted such that higher flow is permitted while the output water is maintained at the predetermined temperature.

An example of the aforementioned flow rate follower function is described in the following sample scenario having a given input or inlet water pressure. In this example the target water flow is 5 gpm at predetermined target temperature. Initially, the water flow limiting valve is set to a predetermined position that is less than its maximum setting, to enable a predetermined flow rate of 3 gpm. As the water heater output temperature nears or attains a steady state condition, the water flow limiting valve gradually opens allowing additional water flow. This occurs as a result of the burner-blower subsystem heating the heat exchanger up to a temperature, or thermal capacity that is capable of delivering output water at a higher flow rate at the predetermined target temperature. An initial flow represented by t=0 is set at 3 gpm. Then at time t=1, the valve opens further to allow flow up to 4 gpm (valve restriction is decreased to allow more flow). Finally at time t=2, the flow is increased to 5 gpm (valve restriction ceases allowing full flow). It is understood that steady state conditions are achieved at both t=1 and t=2 time intervals. This allows for the heat exchanger-burner blower system to catch-up to the heat demand while maintaining the desired outlet temperature since the burner cannot instantly achieve the desired thermal output.

When a hybrid tankless water heating system is initially turned on, the system selects one of a number of default operating points; the operating points include burner heat output values and associated optimum blower speeds that are optimized for specific operating environments. The default schedule of operating points is constructed with the typical environment in mind. Situations exist where the environment of a specific water heater installation cause operating points to deviate from their default values. In such situations, it would be advantageous to update the schedule of default operating points with values better suited to the given installation environment. The default value or values will only be added to, replaced and/or initiate a modification of the schedule of operating points when a new operating point satisfies a schedule of operating points update criteria.

An automatic blower adjustment is a valuable feature due to installation variations. Each installation would have specific air intake, exhaust restriction, gas pressure variation. The blower formula included from the factory could be more than 10% off. Auto calibration type software would use the burner heat output (mdot×Cp×delta T) and blower speed parameters to confirm or update the factory map to each specific install, wherein mdot is mass flow rate of water, Cp is the specific heat capacity of water, and delta T is the difference between Tinlet and Toutlet. This would improve the performance of a tankless water heating system, which includes improvements in transient time delays and time to reach steady state temperature conditions.

A method for updating a default schedule of operating points would utilize water heater operating parameters including mass flow rate, Tinlet, Toutlet, and blower speed (rpm) to run the predetermined computations and create a map or an updated schedule of operating points. Other conditions required to enable an update to the default schedule of operating points would include the attainment of steady state conditions as it pertains to water output temperature, water flow or rate, and blower speed.

Below is an example of a factory set default schedule of operating points relating burner heat output to blower speed.

| Burner Heat Output (kBTU/hr) | Speed (RPM) |
|---|---|
| 10 | 900 |
| 15 | 950 |
| 200 | 5700 |

When a new data point that satisfies the point update criteria is identified, the controller would modify the default schedule of operating points in light of the new information or new operating point; e.g. add a new data point to the default schedule or replace an existing data point.

In one embodiment of the present invention, the schedule of default operating points updating system is accomplished in a water heating system having one temperature sensor for measuring water output, one temperature sensor for measuring water input, a blower monitor for determining blower speed, and a controller functionally connected to each of said temperature sensors and said blower monitor. The controller samples the temperature sensors and monitors blower operation in search for an improved operating point(s) that satisfy the schedule of operating points update criteria. Once an operating point(s) meets or satisfies the update criteria, the new improved operating point will be incorporated into the default schedule of operating points. The following is an example of a schedule of operating points update criteria algorithm:

Heat output X at a particular blower speed Y, is determined by using the following formula:

$$X = m\text{dot} \times Cp \times (Toutlet - Tinlet),$$

where
mdot is the water mass flow rate,
Cp is the specific heat capacity,
Toutlet is the temperature of heated outgoing water, and
Tinlet is the temperature of cold incoming water.

X is determined using the above formula while Y is obtained by using a blower monitor. X is typically expressed in kBTU/hr units, while blower speed is typically expressed in rpm. The following is a table representing five operating points of heat output versus blower speed.

| | |
|---|---|
| X1 | Y1 |
| X2 | Y2 |
| X3 | Y3 |
| X4 | Y4 |
| X5 | Y5 |

Any new X Y pair (new operating point) is only considered for incorporation into the above table if the point reaches a predetermined steady state condition. Steady state condition is achieved or satisfied when Toutlet, Tinlet, flow rate and blower speed have been in a substantially steady condition for a predetermined period of time. The term K is defined as the variance threshold below which a new operating point is used for updating the factory default table.

EXAMPLES

Example 1

While water heater is in a steady state condition with conditions X1<X<X2 and Y1<Y<Y2 being satisfied, and if the absolute difference between ratio (X−X1)/(X2−X1) and ratio (Y−Y1)/(Y2−Y1) is greater than K, then the proposed new operating point or pair X, Y will be discarded. If the difference is less than K, then the proposed new operating point or pair X, Y will be incorporated into the factory default table. X1, Y1 and X2, Y2 will be retained.

Example 2

While water heater is in a steady state condition, with conditions X2<X<X3 and Y1≦Y≦Y2 being satisfied, and if the absolute difference between ratio (X−X1)/(X3−X1) and ratio (Y−Y1)/(Y3−Y1) is greater than K, and then the proposed new operating point or pair X, Y will be discarded. However, if the difference is less than K, then the proposed new operating point or pair X, Y will be incorporated into the lookup table. However, in this example, the existing X2, Y2 operating point will be replaced with the new operating point or pair X, Y.

It is to be understood that a plurality of methods may be employed in determining whether an X, Y pair should be adopted.

Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the conception regarded as the present invention.

The invention claimed is:

1. A hybrid tankless water heating system having a system input and a system output and configured to provide a water supply, wherein said hybrid tankless water heating system is housed in an enclosure having a top and comprises:
a heat exchanger having an input and an output,
a buffer tank having an input and an output,
an internal recirculation flow watercourse,
a pump,
a modulating valve,
a main flow path having an inlet and an outlet, wherein said main flow path outlet is connected to said system output, wherein said input of said buffer tank is fluidly connected to said output of said heat exchanger thereby positioning said buffer tank at a downstream location from said heat exchanger, and said internal recirculation flow watercourse fluidly connects said main flow path inlet and said main flow path outlet, creating a means for simultaneously circulating water through both said buffer tank and said heat exchanger as modulated by said modulating valve and all of said heat exchanger, said buffer tank and said pump are fluidly disposed on said main flow path.

2. The hybrid tankless water heating system of claim 1, wherein said system further comprises an internal recirculation system having a timer integrated therewith such that said internal recirculation system is activated for a predetermined length of time, thereby minimizing a temperature variation and a wait time of said system output water.

3. The hybrid tankless water heating system of claim 1, wherein said buffer tank further comprises a thermally insulative material disposed about an outer most portion of said buffer tank, whereby a thermal loss associated with said buffer tank is minimized.

4. The hybrid tankless water heating system of claim 1, wherein said buffer tank further comprises a means for mixing, whereby a substantially uniform temperature is created within said buffer tank, and includes exactly one temperature sensor located within said buffer tank, wherein said substantially uniform temperature of said buffer tank is measured.

5. The hybrid tankless water heating system of claim 1, wherein both said system input and system output are disposed about said top of said enclosure of said hybrid tankless water heating system, thereby streamlining installation and minimizing a pressure loss in an installation having a low-level placement.

6. The hybrid tankless water heating system of claim 1, further comprising an external circulation system, wherein both said system input and system output are fluidly connected to each other via said external circulation system such that said water supply is set in motion for a predetermined length of time, thereby minimizing a water temperature variation and a wait time of said system output.

7. The hybrid tankless water heating system of claim 1, wherein said hybrid tankless water heating system further includes a backup power mode, thereby providing limited hot water use and protection against freezing during main power failure.

8. The hybrid tankless water heating system of claim 1, wherein said buffer tank further comprises an auxiliary means for heating, whereby said auxiliary means for heating provides an additional thermal energy to increase a heating rate of a water flow of said system output, thereby minimizing a water temperature variation and a wait time of said system output.

9. The hybrid tankless water heating system of claim 8, wherein said auxiliary means for heating is an energy selected from the group consisting of solar energy, geothermal energy, microwave energy and electric energy.

10. A hybrid tankless water heating system having a system input and a system output and configured to provide a water supply, wherein said hybrid tankless water heating system is housed in an enclosure having a top, comprising:
a differential pressure switch system having a first sensing end and a second sensing end;
a heat exchanger having an input and an output; and
a buffer tank having an input and an output,
wherein said input of said buffer tank is fluidly connected to said output of said heat exchanger thereby positioning said buffer tank at a downstream location from said heat exchanger, and said first sensing end is disposed onto said input of said heat exchanger and said second sensing end is disposed onto said output of said buffer tank, whereby said differential pressure switch system is configured to detect low water flow situations.

11. The hybrid tankless water heating system of claim 10, wherein said system further comprises a burner and a differential pressure switch system that is functionally connected to said burner wherein detection of a slight pressure change pre-activates said burner, thereby decreasing a delay associated with water flow type detection.

12. The hybrid tankless water heating system of claim 10, wherein said system further comprises a differential pressure switch control monitor that is functionally connected to a pressure switch system wherein detection of an extended uniform low pressure differential generates an alarm signal.

13. A hybrid tankless water heating system having a system input and a system output and configured to provide a water supply, wherein said hybrid tankless water heating system is housed in an enclosure having a top, comprising:
a heat exchanger having an input and an output;
a buffer tank having an input and an output;
an internal recirculation flow watercourse which fluidly connects said output of said buffer tank to said input of said heat exchanger thereby creating a means for simultaneously circulating water through both said buffer tank and said heat exchanger;
an internal recirculation system having a timer integrated therewith such that said internal recirculation system is activated for a predetermined length of time, thereby minimizing a temperature variation and a wait time of said system output water; and
an antibacterial hot water flush mode feature for said internal recirculation system,
wherein said input of said buffer tank is fluidly connected to said output of said heat exchanger thereby positioning said buffer tank at a downstream location from said heat exchanger, and said antibacterial hot water flush mode feature sanitizes said water supply.

14. A hybrid tankless water heating system having a system input and a system output and configured to provide a water supply, wherein said hybrid tankless water heating system is housed in an enclosure having a top, comprising:
an external circulation system;
an antibacterial hot water flush mode feature for said external circulation system;
a heat exchanger having an input and an output; and
a buffer tank having an input and an output,
wherein said input of said buffer tank is fluidly connected to said output of said heat exchanger thereby positioning said buffer tank at a downstream location from said heat exchanger, both said system input and system output are fluidly connected to each other via said external circulation system such that said water supply is set in motion for a predetermined length of time, thereby minimizing a water temperature variation and a wait time of said system output, and said antibacterial hot water flush mode feature sanitizes said water supply.

15. A hybrid tankless water heating system having a system input and a system output and configured to provide a water supply, wherein said hybrid tankless water heating system is housed in an enclosure having a top, comprising:
a means for generating an alarm signal activated by a cooperating sensor;
a heat exchanger having an input and an output; and
a buffer tank having an input and an output,
wherein said input of said buffer tank is fluidly connected to said output of said heat exchanger thereby positioning said buffer tank at a downstream location from said heat exchanger, and said cooperating sensor is a sensor selected from the group consisting of a moisture sensor, condensate level sensor, and flue gas temperature sensor, thereby providing a means for detecting a plurality of common system problems.

16. A hybrid tankless water heating system having a system input for an inlet flow and a system output for an outlet flow, the hybrid tankless water heating system comprising:
- a heat exchanger having an input and an output, a buffer tank having an input and an output, and a three way valve having a valve input, a first valve output and a second valve output, wherein
- the output of the buffer tank is fluidly connected to the system output,
- the input of the buffer tank is fluidly connected to the first valve output of the three way valve,
- the second valve output of the three way valve is fluidly connected to the system output,
- the output of the heat exchanger is fluidly connected to the valve input of the three way valve, and
- the input of the heat exchanger is fluidly connected to the system input; and
- wherein the three way valve has a plurality of valve states corresponding to three basic predetermined flow conditions consisting of:
- flow from the valve input of the three way valve being entirely directed to the first valve output,
- flow from the valve input of the three way valve being entirely directed to the second valve output, and
- flow from the valve input of the three way valve being divided between the first valve output and the second valve output in a predetermined ratio.

17. The hybrid tankless water heating system of claim 16, wherein the system further comprises a single pump fluidly connected to the system output disposed at a location that is downstream from both the output of the buffer tank and the second valve output of the three way valve.

18. The hybrid tankless water heating system of claim 16, wherein the system further comprises a flow limiting valve fluidly connected to the system input disposed at an upstream location from both the output of the buffer tank and the heat exchanger such that the inlet flow and the outlet flow is reduced such that a condition where target temperature cannot be achieved due to excessive flow is overcome.

19. The hybrid tankless water heating system of claim 16, wherein the system further comprises a dedicated system water output line having a dedicated water temperature output, and a dedicated three way valve having a dedicated valve output, a first dedicated valve input and a second dedicated valve input, and a controller functionally connected to the dedicated three way valve, wherein
- the dedicated valve output of the dedicated three way valve is fluidly connected to the dedicated system water output line,
- the first dedicated valve input is fluidly connected to the system input,
- the second dedicated valve input is fluidly connected to the system output, and
- the controller adjusts the dedicated three way valve such that the dedicated water temperature output is achieved on the dedicated system water output line.

20. The hybrid tankless water heating system of claim 16, wherein the system further comprises an external auxiliary device circuit having
- an auxiliary heat sink having an auxiliary heat sink input and an auxiliary heat sink output,
- an auxiliary valve having an auxiliary valve output and an auxiliary valve input, and
- a controller functionally connected to the auxiliary valve, wherein
- the auxiliary valve output is fluidly connected to the system input,
- the auxiliary valve input is fluidly connected to the auxiliary heat sink output,
- the auxiliary heat sink input is fluidly connected to the system output, and
- the controller manages the auxiliary valve such that external recirculation causes a flow from the system output to the system input.

\* \* \* \* \*